United States Patent
Nakano et al.

(10) Patent No.: US 8,189,773 B2
(45) Date of Patent: May 29, 2012

(54) CIRCUIT UPDATING SYSTEM

(75) Inventors: Toshihisa Nakano, Osaka (JP);
Natsume Matsuzaki, Osaka (JP);
Shinichi Marui, Osaka (JP)

(73) Assignee: Panasonic Corporation, Osaka (JP)

( * ) Notice: Subject to any disclaimer, the term of this patent is extended or adjusted under 35 U.S.C. 154(b) by 1238 days.

(21) Appl. No.: 11/918,628

(22) PCT Filed: Apr. 21, 2006

(86) PCT No.: PCT/JP2006/308439
§ 371 (c)(1),
(2), (4) Date: Oct. 16, 2007

(87) PCT Pub. No.: WO2006/115213
PCT Pub. Date: Nov. 2, 2006

(65) Prior Publication Data
US 2009/0067632 A1    Mar. 12, 2009

(30) Foreign Application Priority Data

Apr. 21, 2005   (JP) ................................ 2005-123220

(51) Int. Cl.
*H04L 9/10* (2006.01)
(52) U.S. Cl. ......................................... 380/29; 713/189
(58) Field of Classification Search .................. 713/193, 713/191, 189, 161, 151, 190, 194; 716/100, 716/101, 117; 380/259, 283, 44, 277
See application file for complete search history.

(56) References Cited

U.S. PATENT DOCUMENTS

| | | | |
|---|---|---|---|
| 5,239,581 A | 8/1993 | Hane | |
| 5,970,142 A * | 10/1999 | Erickson | 713/189 |
| 6,101,255 A | 8/2000 | Harrison et al. | |
| 6,768,337 B2 * | 7/2004 | Kohno et al. | 326/41 |
| 6,823,069 B1 | 11/2004 | Kitajima et al. | |
| 6,981,153 B1 | 12/2005 | Pang et al. | |
| 7,000,161 B1 * | 2/2006 | Allen et al. | 714/725 |
| 7,127,616 B2 | 10/2006 | Kaneko | |
| 7,577,726 B1 * | 8/2009 | Conard et al. | 709/221 |

FOREIGN PATENT DOCUMENTS

| | | |
|---|---|---|
| JP | 5-22281 | 1/1993 |
| JP | 10-55135 | 2/1998 |
| JP | 10-320191 | 12/1998 |
| JP | 11-205125 | 7/1999 |
| JP | 2000-124317 | 4/2000 |
| JP | 2001-306343 | 11/2001 |
| JP | 2004-7472 | 1/2004 |
| JP | 2004-515180 | 5/2004 |

OTHER PUBLICATIONS

International Search Report issued Jul. 4, 2006 in the International (PCT) Application of which the present application is the U.S. National Stage.

* cited by examiner

*Primary Examiner* — Gilberto Barron, Jr.
*Assistant Examiner* — Izunna Okeke
(74) *Attorney, Agent, or Firm* — Wenderoth Lind & Ponack, L.L.P.

(57) ABSTRACT

An information processing apparatus includes a reconfigurable unit in which a circuit is reconfigured. A generation unit generates design data for the circuit configured by the reconfigurable unit and reduces the amount of design data to be held by a design data storage unit.

16 Claims, 12 Drawing Sheets

FIG. 4A
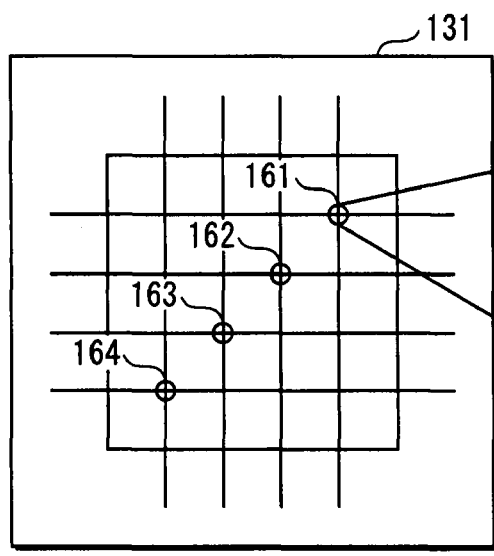
FIG. 4B
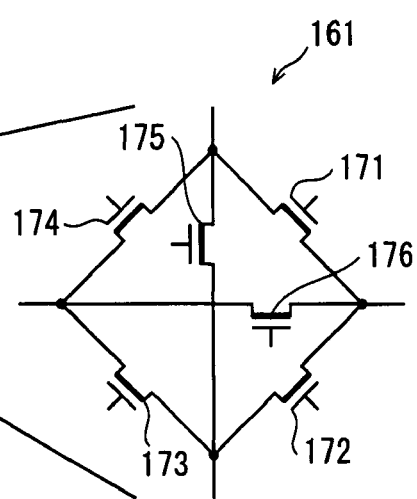
FIG. 5
200 DESIGN DATA TABLE
| DESIGN DATA ID | ENCRYPTED DESIGN DATA | |
|---|---|---|
| A | Enc_ARC_A | 201 |
| B | Enc_ARC_B | 202 |
| ⋮ | ⋮ | |
| I | Enc_ARC_I | 203 |
| J | Enc_ARC_J | 204 |
| K | Enc_ARC_K | 205 |
| ⋮ | ⋮ | |

FIG. 6

210 DESIGN DATA TABLE

| DESIGN DATA ID | ENCRYPTED DESIGN DATA | |
|---|---|---|
| B | Enc_ARC_B | 202 |
| ⋮ | ⋮ | |
| I | Enc_ARC_I | 203 |
| J | Enc_ARC_J | 204 |
| K | Enc_ARC_K | 205 |
| ⋮ | ⋮ | |
| V | Enc_ARC_V | 206 |

FIG. 7

300 KEY TABLE

| DESIGN DATA ID | KEY DATA | |
|---|---|---|
| A | K_A | 301 |
| B | K_B | 302 |
| ⋮ | ⋮ | |
| V | K_V | 303 |
| ⋮ | ⋮ | |

FIG. 11

400 STATE INFORMATION

| LOGIC BLOCK | DESIGN DATA ID |
|---|---|
| LB1<br>LB2 | A |

FIG. 12

410 STATE INFORMATION

| LOGIC BLOCK | DESIGN DATA ID |
|---|---|
| LB1<br>LB4 | A |
| LB2<br>LB3<br>LB5<br>LB6 | B |

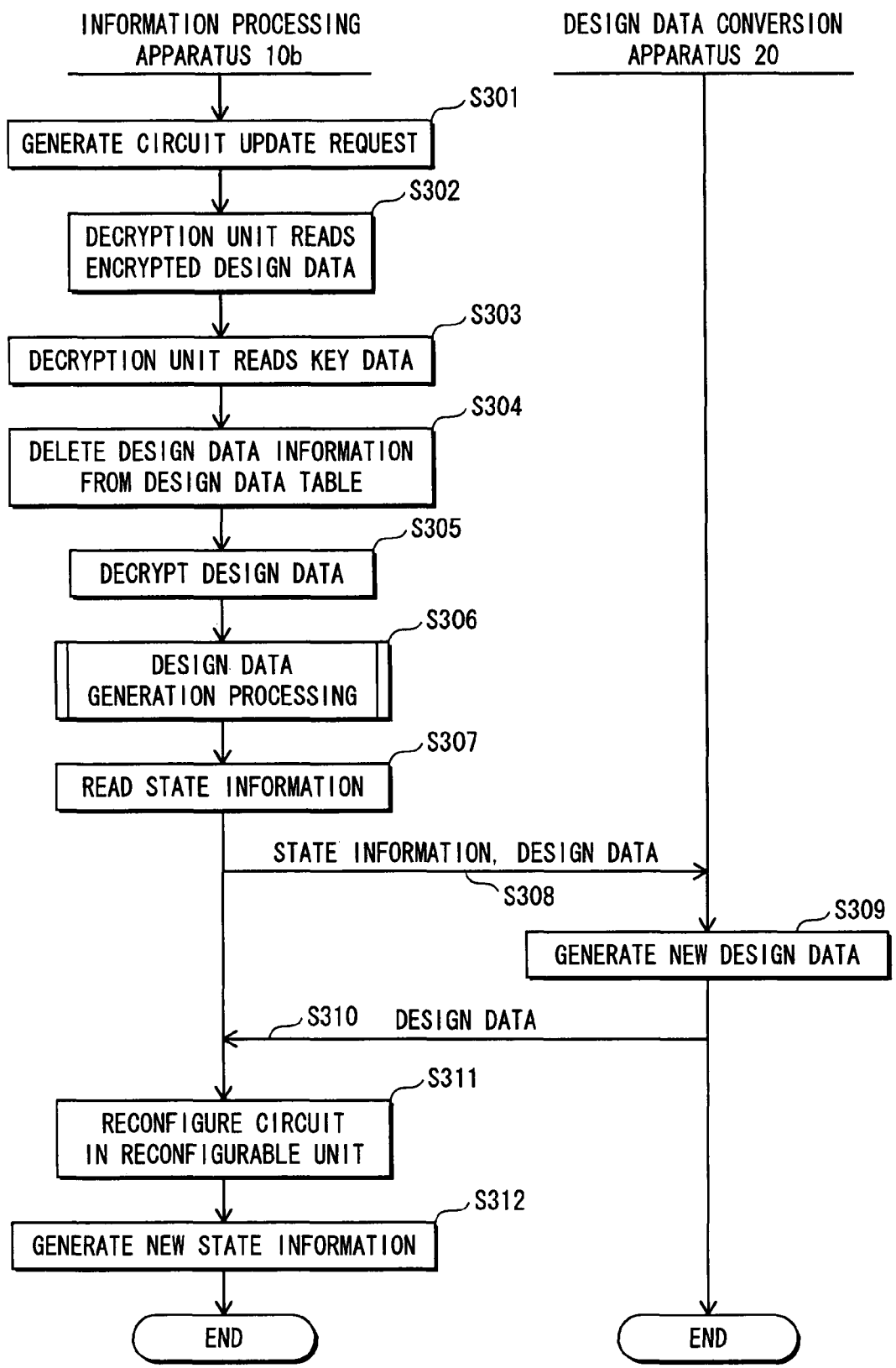

CIRCUIT UPDATING SYSTEM

BACKGROUND OF THE INVENTION

1. Technical Field

The present invention relates to a technique for updating a circuit implemented in a device.

2. Background Art

In general, content distributed via a network, content recorded to a recording medium, and the like, is encrypted before distribution in order to prevent unauthorized use of the content and to protect a copyright thereof. In a device for playing back the content, decryption processing is performed to decrypt the encrypted content, and an encryption method is frequently implemented in the device by hardware in view of the required processing speed and tamper-resistance.

There is a desire to update encryption methods implemented by hardware to new encryption methods. In recent years, reconfiguring a circuit and updating an encryption method have become possible by using a reconfigurable device such as an FPGA (Field Programmable Gate Array) or a PLA (Programmable Logic Array)(see patent document 1).

Also, patent document 2 discloses a technique for holding, in a device, a database that stores an algorithm file for updating a circuit, acquiring the algorithm file from the database in accordance with an external instruction, and updating the implemented circuit.

Patent document 1: Japanese Patent Application Publication No. H10-320191

Patent document 2: Japanese Patent Application Publication No. H10-55135

SUMMARY OF THE INVENTION

However, although the aforementioned conventional technology for holding a database in a device is useful for updating a circuit, there is a desire to reduce an amount of data in the database in order to effectively use a storage capacity of the device.

The present invention has been achieved to address the above desire, and aims to provide a circuit updating system that can update a circuit implemented in the device while storing a smaller amount of data in the database than in conventional technology.

The object of the present invention is achieved by an information processing apparatus including a reconfigurable unit including a plurality of logic blocks and operable to configure a circuit by changing a logic of one or more of the logic blocks and changing an inter-logic-block connection; a generation unit operable to generate, by analyzing the reconfigurable unit, first design data indicating a logic of one or more of the logic blocks and an inter-logic-block connection that pertain to a first circuit currently configured in the reconfigurable unit; and an output unit operable to output, to the reconfigurable unit, second design data that indicates a logic of one or more of the logic blocks and an inter-logic-block connection that pertain to a second circuit, wherein the reconfigurable unit changes the currently configured first circuit in accordance with the second design data to configure the second circuit.

The abovementioned "reconfigurable unit" corresponds to a reconfigurable unit of the below embodiments. A generation unit of the embodiments fulfills the functions of the "generation unit" above. An update unit of the embodiments fulfils the functions of the "output unit".

According to the above structure, given that the generation unit can generate the first design data, the information processing apparatus does not need to internally store the first design data while the reconfigurable unit is implementing the first circuit in accordance with the first design data. Accordingly, memory capacity inside the device can be conserved and utilized effectively.

Here, the information processing apparatus may further include a design data storage unit operable to have stored therein the second design data; a deletion unit operable to delete the second design data from the design data storage unit after the output unit has output the second design data to the reconfigurable unit; and a write unit operable to write the first design data generated by the generation unit to the design data storage unit after the deletion unit has deleted the second design data.

A design data storage unit of the below embodiments fulfils the functions of the above "design data storage unit". The design data storage unit of the embodiments also fulfils the functions of the "deletion unit" and the "write unit".

According to this structure, the amount of design data stored by the design data storage unit can be reduced, since the second design data is deleted from the design data storage unit after being output to the reconfigurable unit by the output unit. Also, although the write unit writes the first design data to the design data storage unit, the design data storage unit does not need to store the design data corresponding to the circuit implemented in the reconfigurable unit since the generation unit is provided, thereby reducing the amount of data in the design data storage unit, unlike conventional technology that needs to store all of the design data in the design data storage unit.

The information processing apparatus may further include an encryption unit operable to encrypt the first design data generated by the generation unit, wherein the write unit writes the first design data that has been encrypted to the design data storage unit.

An encryption unit of the below embodiments fulfills the functions of the above "encryption unit".

Furthermore, the second design data stored in the design data storage unit may be encrypted, and the information processing apparatus may further include a decryption unit operable to decrypt the encrypted second design data to generate the second design data, and the output unit may output the second design data that has been generated by the decryption unit to the reconfigurable unit.

An encryption unit of the below embodiments fulfills the functions of the above "encryption unit".

According to this structure, the first design data and the second design data stored in the design data storage unit are encrypted, and therefore unauthorized use can be prevented even if there is an external access to the design data storage unit and the first and second design data are leaked. Also, provision of the decryption unit enables the first and second design data generated by the decryption unit to be used for reconfiguring a circuit in the reconfigurable unit.

Here, the information processing apparatus may further include a key information storage unit operable to have securely stored therein first key information in correspondence with the first design data, and second key information in correspondence with the second design data, wherein the encryption unit reads the first key information from the key information storage units and encrypts the first design data with use of the read first key information, and the decryption unit reads the second key information from the key information storage unit, and decrypts the second design data with use of the read second key information.

A key storage unit of the below embodiments fulfils the functions of the "key storage unit" above.

According to this structure, the key information used by the encryption unit and the decryption unit is unique to each piece of design data, and security is improved over a case of encryption using the same key information. Furthermore, the key information is stored securely in the key data storage unit, and even if there is an external access to the design data storage unit and the first and second design data are leaked, obtaining the key data is difficult, thereby preventing unauthorized use of the first and second design data.

The information processing apparatus may further include a key information generation unit operable to generate the first and second key information in correspondence with the first and second design data respectively, and to write the first and second key information generated by the key information generation unit to the key information storage unit.

According to this structure, external leakage of key information can be prevented, since key information is generated internally in the information processing apparatus.

The information processing apparatus may further include an internal state storage unit operable to have stored therein an internal state indicating a position of the one or more logic blocks used in the configuration of the first circuit in the reconfigurable unit; and an optimization unit operable to generate the second design data so as to enable effective use of the reconfigurable unit, the second design data being generated with use of the internal state stored in the internal state storage unit, the first design data generated by the generation unit, and third design data which pertains to a circuit that achieves a second function that differs from a first function achieved by the first circuit, wherein the output unit outputs the second design data that has been generated by the optimization unit to the reconfigurable unit.

The internal state storage unit may generate new internal state information indicating the position of the one or more logic blocks used in the configuration of the first circuit achieving the first function and a position of one or more of the logic blocks used in the configuration of the circuit achieving the second function, and may store the generated new internal state information.

According to this structure, rather than replacing the first circuit that achieves the first function with the second circuit that achieves a different function, the reconfigurable unit of the information processing apparatus can reconfigure a new second circuit that achieves the first and second functions. Furthermore, the circuit can be reconfigured so as to optimize the logic blocks in the reconfigurable unit since the internal state storage unit stores the state information.

Also, even in this case, the design data (i.e., the first design data and the second design data) realizing the circuit structure in the reconfigurable unit does not need to be stored in the design data storage unit, and therefore the amount of data in the design data storage unit can be reduced.

Also, when the circuit achieving the first function and the second function are configured in the reconfigurable device, the internal state storage unit stores information indicating the position of logic blocks corresponding to the functions, thereby enabling the generation unit to individually analyze the reconfigurable unit to generate design data corresponding to the first function and design data corresponding to the second function.

The information processing apparatus of claim 1 may further include an internal state storage unit operable to have stored therein an internal state indicating a position of the one or more logic blocks used in the configuration of the first circuit in the reconfigurable unit; wherein the generation unit generates the first design data by selectively analyzing the reconfigurable unit in accordance with the internal state stored by the internal state storage unit.

This structure enables the generation unit, when generating the first design data by analyzing the reconfigurable unit, to efficiently perform generation processing by referring to the internal state.

The information processing apparatus may be connected to an external device via a network, and may further include a transmission unit operable to transmit, to the external device, the internal state stored in the internal state storage unit, the first design data generated by the generation unit, and third design data that pertains to a circuit achieving a function that is different from the first function; and a reception unit operable to receive the second design data that enables effective use of the reconfigurable unit from the external device.

According to this structure, rather than replacing the first circuit that achieves the first function with the second circuit that achieves a different function, the reconfigurable unit of the information processing apparatus can reconfigure a new second circuit that achieves the first and second functions. Furthermore, the circuit can be reconfigured so as to optimize the logic blocks in the reconfigurable unit since the internal state storage unit stores the state information.

Also, the amount of processing performed by the information processing apparatus can be reduced by requesting an external device to generate new design data. Also, the first circuit configured in the reconfigurable unit in accordance with the first design data may achieve a first function, and the information processing apparatus may further include a design data conversion unit operable to, with use of the first design data generated by the generation unit and third design data for configuring a third circuit that achieves a second function that is different from the first function, generate the second design data for configuring the second circuit that achieves the first and second functions.

According to this structure, rather than replacing the first circuit that achieves the first function with the second circuit that achieves a different function, the reconfigurable unit of the information processing apparatus can reconfigure a new second circuit that achieves the first and second functions. Also, even in this case, the design data (i.e., the first design data and the second design data) realizing the circuit structure in the reconfigurable unit does not need to be stored in the design data storage unit, and therefore the amount of data in the design data storage unit can be reduced.

The information processing apparatus of claim 1 may further include a media input/output unit operable to receive an input from and output information to an externally connected recording medium; and a write unit operable to write the first design data to the recording medium via the media input/output unit, wherein the output unit may acquire, via the media input/output unit, the second design data from the recording medium on which the second design data has been recorded, and may output the acquired second design data to the reconfigurable unit.

According to this structure, the amount of design data recorded on the recording medium can be reduced, since the second design data is deleted from the recording medium after being output to the reconfigurable unit by the output unit. Also, although the write unit writes the first design data to the recording medium, by provision of a generation unit in the information processing apparatus, the recording medium does not need to store the design data corresponding to a circuit implemented in the reconfigurable unit.

The information processing apparatus may further include an encryption unit operable to encrypt the first design data generated by the generation unit, wherein the write unit may write the first design data that has been encrypted to the recording medium.

According to this structure, the first design data and the second design data recorded on the recording medium are encrypted, and therefore unauthorized use can be prevented even if there is an external access to the recording medium and the first and second design data are leaked. Also, provision of a decryption unit enables the first and second design data generated by the decryption unit to be used for reconfiguring a circuit in the reconfigurable unit.

BRIEF DESCRIPTION OF THE DRAWINGS

FIG. 4A shows a main outline of a switch matrix 131, and

FIG. 4B shows an internal structure of a transistor switch group;

FIG. 5 shows a data structure of a design data table 200;

FIG. 6 shows a data structure of a design data table 210;

FIG. 7 shows a data structure of a key table 300;

FIG. 11 shows a data structure of state information 400 stored in an internal state storage unit 108a;

FIG. 12 shows a data structure of state information 410 stored in the internal state storage unit 108a;

FIG. 13 is a flowchart showing overall operations of the information processing apparatus 10a;

FIG. 15 is a flowchart showing overall operations of the circuit updating system 1.

Figure 1:
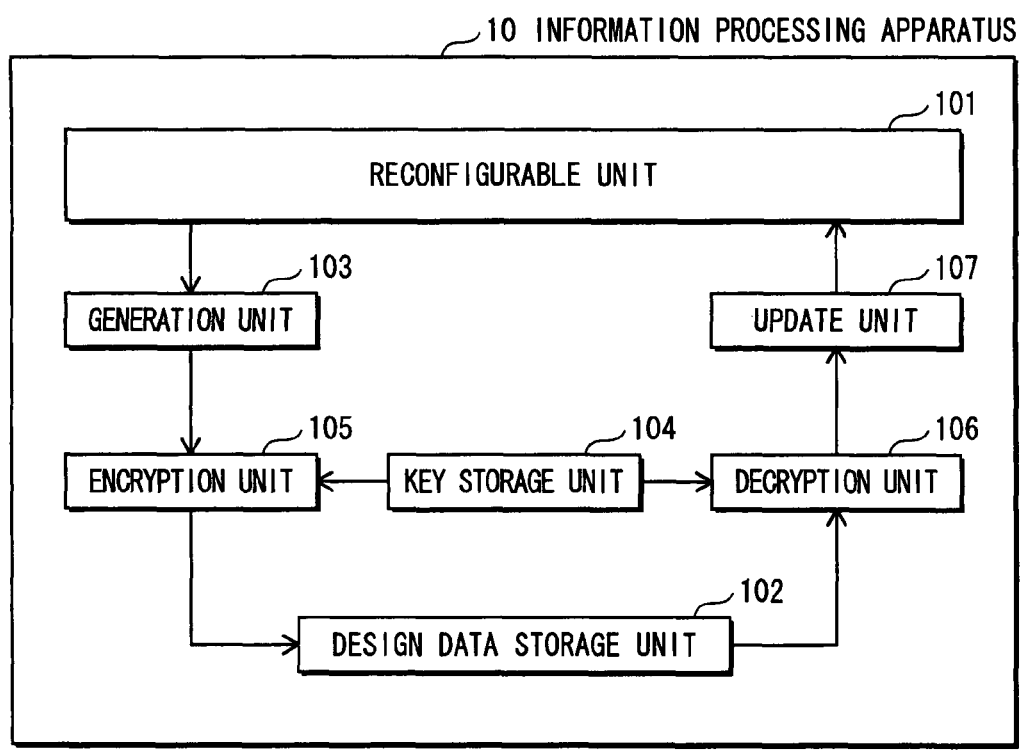
FIG. 1 is a functional block diagram showing a functional structure of an information processing apparatus 10 which is embodiment 1 of the present invention.

DESCRIPTION OF THE CHARACTERS 1 circuit updating system
10 information processing apparatus
10a information processing apparatus
10b information processing apparatus
20 design data conversion apparatus
30 network
101 reconfigurable unit
101a reconfigurable unit
101b reconfigurable unit
102 design data storage unit
102a design data storage unit
102b design data storage unit
103 generation unit
103a generation unit
103b generation unit
104 key storage unit
104a key storage unit
104b key storage unit
105 encryption unit
105a encryption unit
105b encryption unit
106 decryption unit
106a decryption unit
106b decryption unit
107 update unit
107a update unit
107b update unit
108a internal state storage unit
108b internal state storage unit
109a optimization unit
110a transmission/reception unit
110b transmission/reception unit
131-146 switch matrix
151-153 LUT
154-155 flip flop
161-164 transistor switch group
171-176 transistor switch
501 transmission/reception unit
502 optimization unit

DETAILED DESCRIPTION OF THE INVENTION

Embodiment 1

An information processing apparatus 10 is described below as embodiment 1 of the present invention.

The information processing apparatus 10 includes a device that can reconfigure a circuit in accordance with design data, and is an apparatus that updates the circuit in response to a request.

Structure

FIG. 1 is a functional block diagram showing a functional structure of the information processing apparatus 10.

As shown in FIG. 1, the information processing apparatus 10 includes a reconfigurable unit 101, a design data storage unit 102, a generation unit 103, a key storage unit 104, an encryption unit 105, a decryption unit 106, and an update unit 107.

The information processing apparatus 10 is a computer system structured specifically from a microprocessor, a ROM, a RAM, a hard disk unit, etc., and the functions of the information processing apparatus 10 are achieved by the microprocessor executing a computer program stored in the RAM or the hard disk unit.

Constituent elements of the information processing apparatus 10 are described below.

(1) Reconfigurable Unit 101

Figure 2:
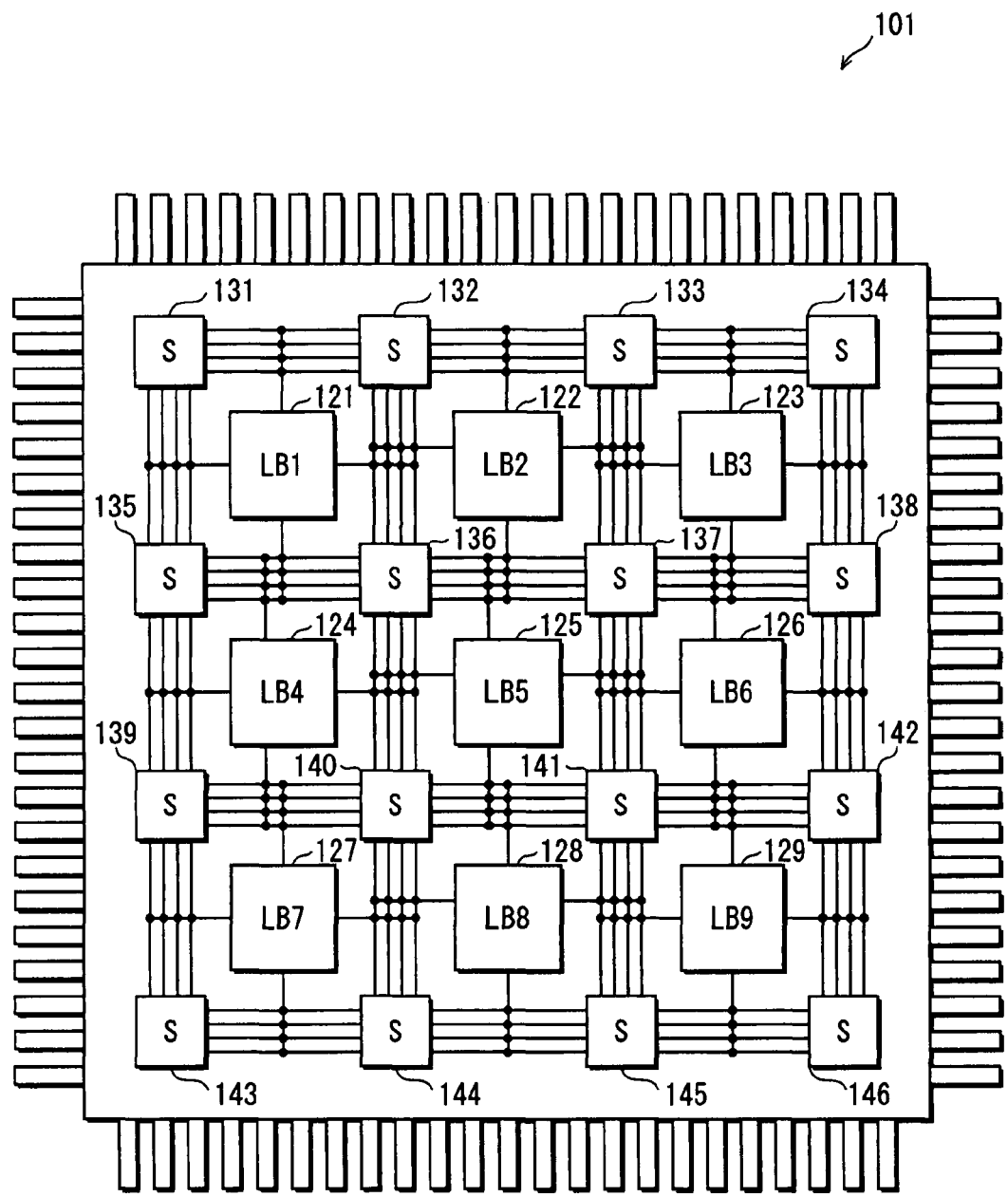
FIG. 2 shows a main outline of a reconfigurable unit 101.

FIG. 2 shows a main outline of the reconfigurable unit 101.

The reconfigurable unit 101 is constituted from a logic block LB1 (121), a logic block LB2 (122), a logic block LB3 (123), a logic block LB4 (124), a logic block LB5 (125), a logic block LB6 (126), a logic block LB7 (127), a logic block LB8 (128), a logic block LB9 (129), sixteen switch matrices 131 through 146, and wiring connecting the logic blocks and the switch matrices.

Figure 3:
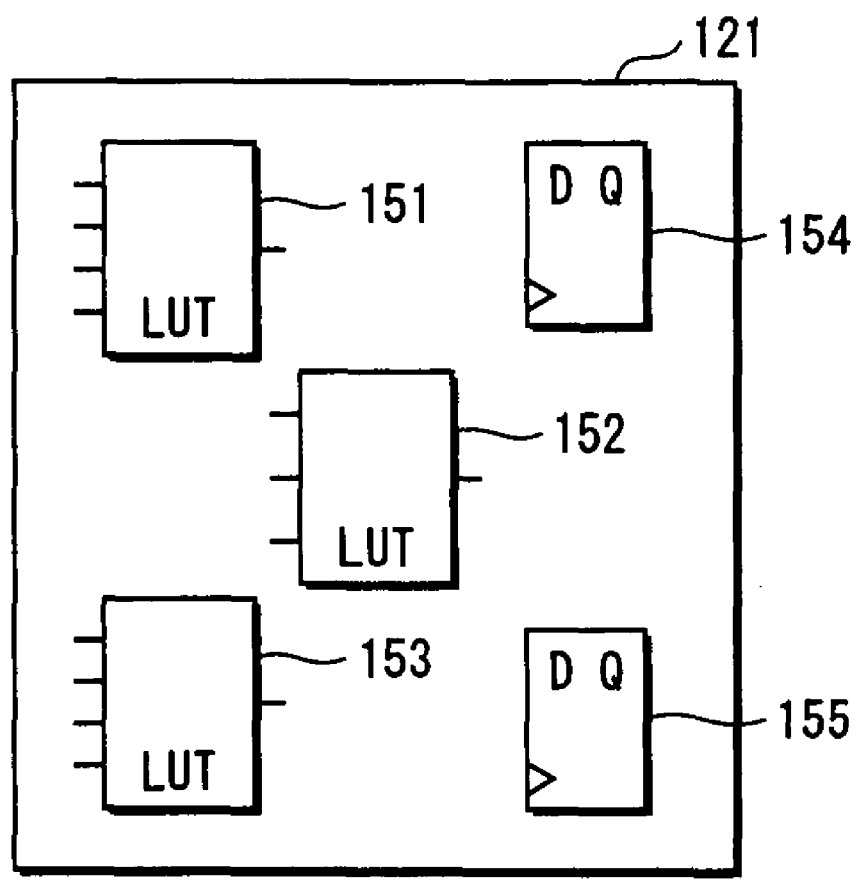
FIG. 3 shows a main outline of a logic block LB1 (121)

FIG. 3 shows the interior of the logic block LB1 (121). Note that logic blocks LB2 (122) through LB9 (129) have a similar structure to the logic block LB1 (121).

The logic block LB1 (121) is constituted from a look-up table (hereinafter referred to as an "LUT") 151, an LUT 152, an LUT 153, a flip flop 154, and a flip flop 155. The LUT 151 and the LUT 153 have a 4-input/1-output structure, and the LUT 152 has a 3-input/1-output structure. However, this is an example, and the present invention is not limited to this. Specifically, each logic block is constituted by a small-scale SRAM.

FIG. 4A shows a structure of the switch matrix 131. Note that the switch matrices 132 through 146 have a structure similar to the switch matrix 131.

The switch matrix 131 is constituted from transistor switch groups 161, 162, 163, and 164 that are disposed at intersections between vertical wiring channels and horizontal wiring channels that constitute the wiring.

FIG. 4B shows a structure of the transistor switch group 161. Note that the transistor switch groups 162 through 164 have a similar structure to the transistor switch group 161.

The transistor switch group 161 is constituted from six transistor switches 171 through 176 that are set to ON or OFF with use of SRAM. In the present description, a bit string that includes LUT setting values of the logic blocks and information indicating ON/OFF settings of the transistor switches is called design data.

Upon receiving an input of design data from the update unit 107, the reconfigurable unit 101 configures or reconfigures various types of circuits by changing the setting values of the LUTs and the ON/OFF settings of the transistor switches in accordance with the input design data. Note that circuit configuration and reconfiguration in the reconfigurable unit 101 can be realized by a known technology, and therefore a detailed description thereof has been omitted.

(2) Design Data Storage Unit 102

The design data storage unit 102 stores and manages a design data table.

FIG. 5 shows a data structure of a design data table 200, which is one example of the design data table. As shown in FIG. 5, the design data table 200 includes design data information 201, 202, 203, 204, and 205, and so on, and each piece of design data information is constituted from a design data ID and encrypted design data.

The design data ID is an identifier for uniquely identifying design data and encrypted design data that was generated by encrypting the design data.

The encrypted design data is generated by performing an encryption algorithm E on design data identified by the corresponding design data ID, with use of key data unique to such design data as an encryption key. Note that one example of the encryption algorithm E is DES (Data Encryption Standard). In the present description, design data whose design data ID is "A" is noted as "ARC_A", design data whose design data ID is "B" is noted as "ARC_B", and so on. Also, encrypted design data generated by encrypting the design data "ARC_A" is noted as "Enc_ARC_A", encrypted design data generated by encrypting the design data "ARC B" is noted as "Enc_ARC_B", and so on.

The design data information 201 includes the design data. ID "A" and the encrypted design data "Enc_ARC_A". The encrypted design data "Enc_ARC_A" is encrypted data generated by encrypting the design data "ARC_A". The design data "ARC_A" is data necessary for reconfiguring a circuit in the reconfigurable unit 101. Specifically, the design data "ARC_A" is a bit string indicating, as described above, LUT setting values inside the reconfigurable unit 101, the ON/OFF settings of the transistor switches, etc.

In order for the reconfigurable unit 101 to reconfigure a circuit, the decryption unit 106 reads a certain piece of encrypted design data, and thereafter the design data storage unit 102 deletes the design data information piece that includes the read encrypted design data from the data design table. Also, upon receiving the encrypted design data and a design data ID from the encryption unit 105, the design data storage unit 102 generates design data information composed of the received encrypted design data and design data ID, and stores the generated design data information in the design data table.

Below, a specific description of the design data table is given with reference to FIGS. 5 and 6.

In a case when the encrypted design data "Enc_ARC_A" is read while the design data storage unit 102 is storing the design data table 200 shown in FIG. 5, the design data information 201 is deleted from the design data table 200, which thus becomes the design data table 210 shown in FIG. 6. Also, upon receiving encrypted design data "Enc_ARC_V" from the encryption unit 105, the design data table 210 generates the design data information 206 composed of a design data ID "V" and the encrypted design data "Enc_ARC_V", and stores the design data information 206 in the design data table 210.

(3) Generation Unit 103

Upon receiving a circuit update request via an input means (not depicted) such as an input device, the generation unit 103 generates design data by analyzing a circuit configured by the reconfigurable unit 101.

Specifically, the generation unit 103 analyzes LUTs from the logic blocks of the reconfigurable unit 101, and furthermore analyzes the information indicating the ON/OFF settings of the transistor switches from the switch matrices. The generation unit 103 generates design data in accordance with a result of the analysis. The generation unit 103 outputs the generated design data to the encryption unit 105, along with the design data ID of the design data. Note that the generation unit 103 already is aware of the design data ID.

The details of the design data generation method are described later with use of the flowchart shown in FIG. 9.

(4) Key Storage Unit 104

The key storage unit 104 stores a key table 300 shown in FIG. 7. As shown in FIG. 7, the key table 300 includes key information 301, 302 and 303, each of which is composed of a design data ID and key data in correspondence with each other.

As a specific example, the key information 303 is composed of the design data ID "V" and the key data "K_V". This indicates that "K_V", is the key data used for encrypting design data "ARC_V", identified by the design data ID "V", and for decrypting the encrypted design data "Enc_ARC_V". The key data "K_V" is, for example, 64-bit data used as a DES encryption/decryption key.

Note that the key storage unit 104 of the present description is tamper-resistant. There is no particular limitation on a method for achieving tamper resistance.

(5) Encryption Unit 105

The encryption unit 105 has an encryption function for converting plain text into encrypted text.

More specifically, upon receiving a piece of design data and a design data ID from the generation unit 103, the encryption unit 105 reads key data corresponding to the received design data ID from the key storage unit 104. The encryption unit 105 performs the encryption algorithm E on the design data with use of the read key data as the encryption key, thereby generating encrypted design data. The encryption unit 105 outputs the generated encrypted design data, along with the design data ID, to the design data storage unit 102.

For example, let us consider a case in which the encryption unit 105 receives the design data "ARC_V" and the design data ID "V" from the generation unit 103. The encryption unit 105 specifies the key information 303 that includes the received design data ID "V" from the key table 300 stored in the key storage unit 104. Next, the encryption unit 105 reads the key data "K_V" from the key information 303. The encryption unit 105 encrypts "ARC_V" with use of the key data "K_V" as the encryption key, thereby generating "Enc_ARC_V".

(6) Decryption Unit 106

The decryption unit 106 has a decryption function for converting encrypted text into plain text.

More specifically, upon receiving a decryption request including a design data ID from the update unit 107, the decryption unit 106 reads key data corresponding to the received design data ID from the key storage unit 104. Furthermore, the decryption unit 106 reads the encrypted design data corresponding to the received design data ID from the design data storage unit 102. The decryption unit 106 performs a decryption algorithm D to decrypt the encrypted data, thereby generating the design data with use of the read key data as the decryption key. The decryption unit 106 outputs the generated design data to the update unit 107. Note that the decryption algorithm D is an algorithm that converts encrypted text, which was encrypted by the encryption algorithm E, into plain text.

As an example, let us consider a case in which the decryption unit 106 receives the design data ID "A" from the update unit 107. The encryption unit 106 specifies key information 301 that includes the received design data ID "A" from the key table 300 stored in the key storage unit 104. Next, the decryption unit 106 reads the key data "K_A" from the key information 301. The decryption unit 106 decrypts "Enc_ARC_A" with use of the key data "K_A" as a decryption key, thereby generating "ARC_A".

(7) Update Unit 107

Upon receiving a circuit update request via an input means (not depicted) such as an input device, the update unit 107 outputs design data for a new circuit to the reconfigurable unit 101.

Specifically, upon receiving an update request that includes a design data ID, the update unit 107 instructs the decryption unit 106 to decrypt the encrypted design data identified by the received design data ID. The update unit 107 receives the design data generated by the decryption unit 106, and outputs the received design data to the reconfigurable unit 101.

For example, in a case of receiving a design data ID "A", the update unit 107 outputs the design data ID "A" to the decryption unit 106. Furthermore, the update unit 107 receives the design data "ARC_A" from the decryption unit 106, and outputs the received design data "ARC_A" to the reconfigurable unit 101.

Operations

Figure 8:
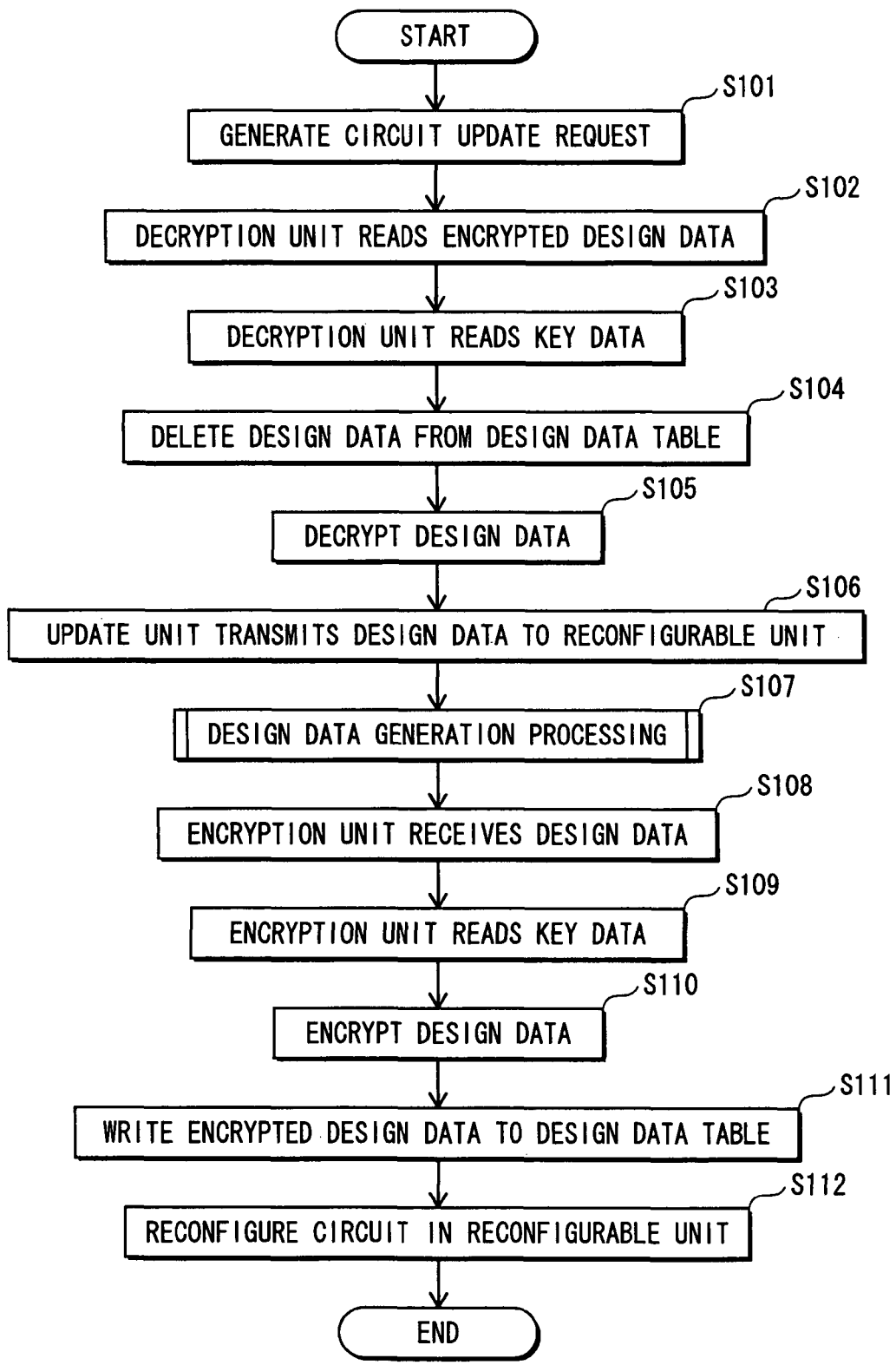
FIG. 8 is a flowchart showing overall operations of the information processing apparatus 10.
Figure 9:
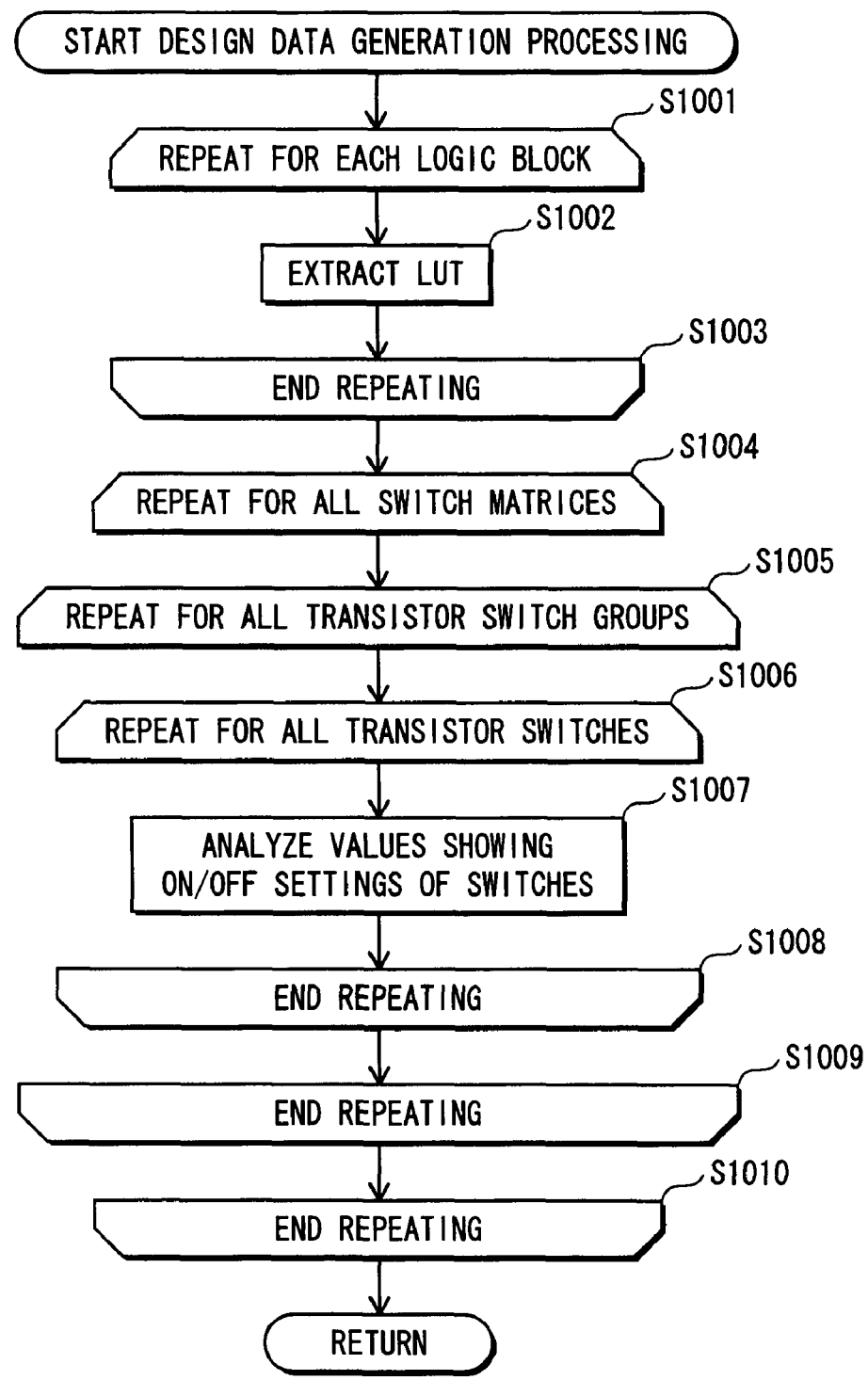
FIG. 9 is a flowchart showing operations of design data generation performed by a generation unit 103.

The following describes operations of the information processing apparatus 10 with reference to flowcharts shown in FIG. 8 and FIG. 9.

(1) Operation of the Information Processing Apparatus 10

First, a circuit update request is generated (step S101) The generation unit 103 and the update unit 107 receive the circuit update request via an input means such as an input device. The update unit 107 also receives a design data ID along with the circuit update request via the input means.

On receipt of the circuit update request including a design data ID, the update unit 107 notifies the design data ID to the decryption unit 106, and instructs the decryption unit 106 to decrypt the encrypted design data identified by the design data ID.

Upon receiving an instruction from the update unit 107, the decryption unit 106 reads the encrypted design data identified by the design data ID from the design data storage unit 102 (step S102). Next, the decryption unit 106 reads the key data corresponding to the design data ID from the key storage unit 104 (step S103).

The design data storage unit 102 deletes the design data information that includes the encrypted design data read in step S102 from the design data table (step S104).

Next, the decryption unit 106 decrypts the encrypted design data read in step S102 by performing the decryption algorithm D on the encrypted design data with use of the key data read in step S103 as the decryption key (step S105). The decryption unit 106 outputs the generated design data to the update unit 107.

Upon receiving the design data from the decryption unit 106, the update unit 107 transfers the received design data to the reconfigurable unit 101 (step S106). Here, the reconfigurable unit 101 may include a memory for temporarily storing the design data transferred from the update unit 107.

Next, the generation unit 103 performs processing for generating the design data of the circuit currently configured in the reconfigurable unit 101 (step S107). Note that the design data generation processing is described in detail later.

The generation unit 103 outputs the generated design data to the encryption unit 105. The encryption unit 105 receives the design data from the generation unit 103 (step S108), and furthermore reads key data corresponding to the design data ID that identifies the design data received in step S108 (step S109).

The encryption unit 105 generates encrypted design data by performing the encryption algorithm E on the design data received in step S108, with use of the key data read in step S109 as the encryption key (step S110). The encryption unit 105 outputs the generated encrypted design data and the design data ID to the design data storage unit 102. The design data storage unit 102 generates design data information including the received encrypted design data and the design data ID in correspondence with each other, and writes the generated design data information to the design data table (step S111).

Next, the reconfigurable unit 101 reconfigures a circuit by setting SPAM values in accordance with the design data received in step S106 (step S112).

Note that the above steps need not necessarily be performed in this order. For example, the transfer processing of step S106 may be executed after design data generation processing (step S107).

(2) Operations of the Design Data Generation Processing Performed by the Generation Unit 103

FIG. 9 is a flowchart showing operations of the design data generation processing performed by the generation unit 103. Note that the operations shown here are details of step S107 of FIG. 8.

The generation unit 103 repeats steps S1001 to S1003 for each of the logic blocks LB1 (121) to LB9 (129) included in the reconfigurable unit 101 (step S1001).

In step S1002, the generation unit 103 analyzes LUT values from a logic block (step S1002). The generation unit 103 ends repeating steps S1001 to S1003 upon analyzing the LUTs from all of the logic blocks (S1003).

Next, the generation unit 103 repeats steps S1004 through S1010 for all of the switch matrices (131 through 146) included in the reconfigurable unit 101 (step S1004).

Next, the generation unit 103 repeats steps S1006 through S1008 for all of the transistor switch groups included in each of the switch matrices (step S1005).

Next, the generation unit 103 repeats steps S1006 through S1008 (step S1006) for all the transistor switches included in each of the transistor switch groups (step S1006).

In step S1006, the generation unit 103 analyzes the values showing the ON/OFF settings of the transistor switches (step S1007).

The generation unit 103 ends repeatedly performing steps S1006 to S1008 upon analyzing all of the values indicating the ON/OFF settings of the transistor switches (step S1008). Next, upon completing the processing of step S1007 for each transistor switch group, the generation unit 103 ends repeating in each transistor switch group (step S1009). Thereafter, upon completing processing of step S1007 for all switch matrices, the generation unit 103 ends repeating in each switch matrix (step S1010). The generation unit 103 generates design data in accordance with results of the analyses of step S1002 and step S1007.

Embodiment 2

The following describes an information processing apparatus 10a as embodiment 2 of the present invention. Similarly to the information processing apparatus 10 of embodiment 1, the information processing apparatus 10a includes a device that can reconfigure circuits in accordance with design data. However, in addition to the functions of information processing apparatus 10, the information processor 10a also optimizes circuits configured by the reconfigurable device.

Structure

Figure 10:
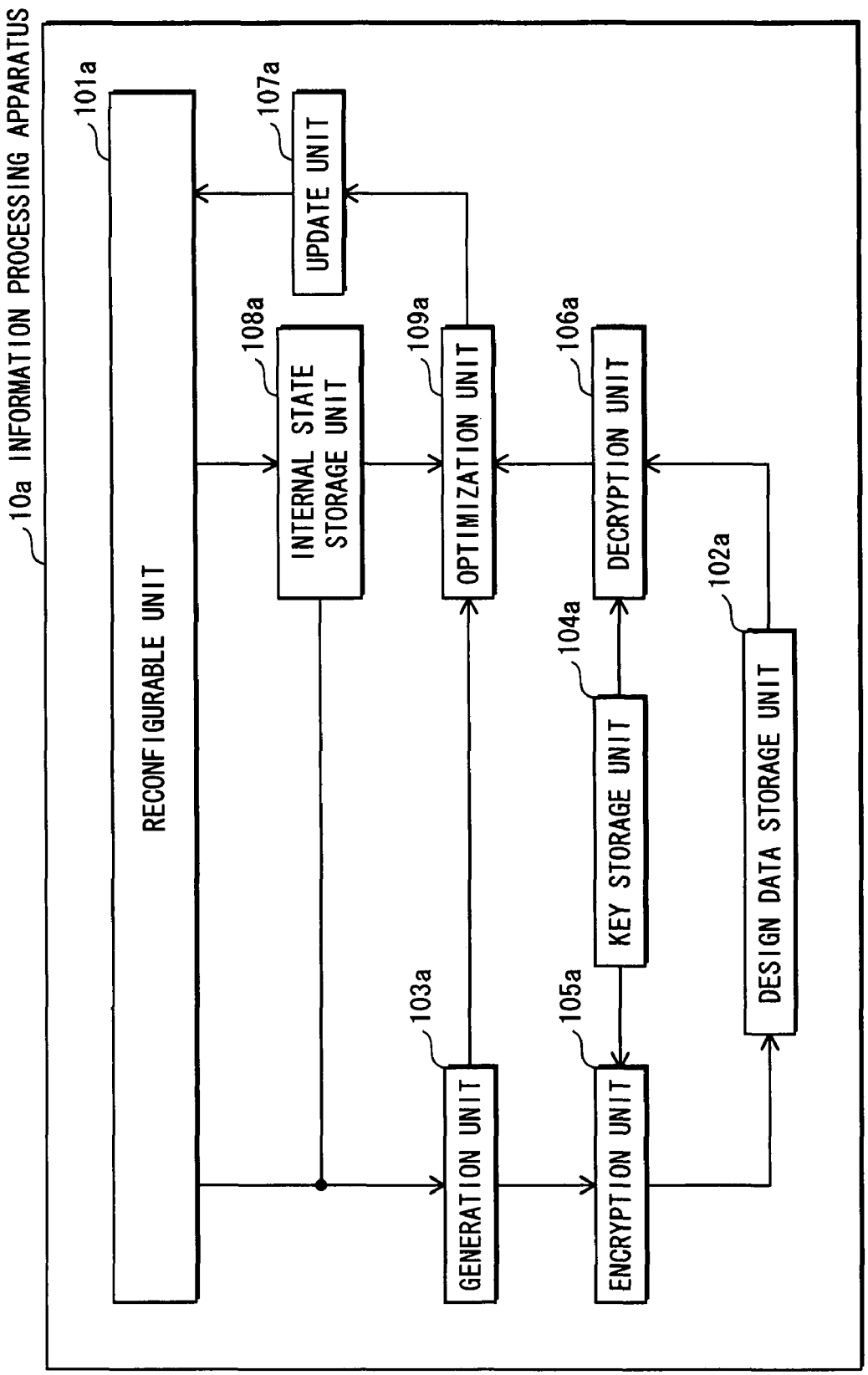
FIG. 10 is a functional block diagram showing a functional structure of an information processing apparatus 10a, which is embodiment 2 of the present invention.

FIG. 10 is a functional block diagram showing a functional structure of the information processing apparatus 10a.

As shown in FIG. 10, the information processing apparatus 10a includes a reconfigurable unit 101a, a design data storage unit 102a, a generation unit 103a, a key storage unit 104a, an encryption unit 105a, a decryption unit 106a, an update unit 107a, an internal state storage unit 108a, and an optimization unit 109a. Unlike the information processing apparatus 10a, the information processor 10a also includes the internal state storage unit 108a and the optimization unit 109a.

The information processing apparatus 10a is a computer system structured specifically from a microprocessor, a ROM, a RAM, a hard disk unit, etc., and the functions of the information processing apparatus 10a are achieved by the microprocessor executing computer programs stored in the RAM or the hard disk unit.

Note that because the reconfigurable unit 101a, the design data storage unit 102a, the generation unit 103a, the key storage unit 104a, the encryption unit 105a, the decryption unit 106a, and the update unit 107a have similar structures and functions to the constituent elements of the information processing apparatus 10, namely the reconfigurable unit 101, the design data storage unit 102, the generation unit 103, the key storage unit 104, the encryption unit 105, the decryption unit 106, and the update unit 107, a description of the above units is omitted, and the following description focuses on the internal state storage unit 108a and the optimization unit 109a, which are constituent elements unique to the information processing apparatus 10a.

(1) Internal State Storage Unit 108a

The internal state storage unit 108a stores an internal state of the reconfigurable unit 101a.

Specifically, the internal state storage unit 108a stores state information indicating which of the logic blocks included in the reconfigurable unit 101a are being used in a circuit configuration.

FIG. 11 shows a data structure of state information 400, which is one example of the state information. As shown in FIG. 11, the state information 400 includes logic blocks LB1 and LB2, and the corresponding design data ID "A". This indicates that the circuit is configured from the logic blocks LB1 and LB2 in the reconfigurable unit 101a according to the design data whose design data ID is "A".

Also, when the circuit configuration in the reconfigurable unit 101a is updated, the internal state storage unit 108a generates new state information, and internally stores the new state information corresponding to the new circuit configuration, in place of the previously stored state information.

Note that upon new design data being generated by the optimization unit 109a, the internal state storage unit 108a may generate the new state information based on the information received from the optimization unit 109a.

For example, unlike the state information 400 shown in FIG. 11, the state information 410 shown in FIG. 12 indicates that the logic block LB1 and a logic block LB4 are in correspondence with the design data ID "A", and the logic blocks LB2, LB3, LB5, and LB6 are in correspondence with a design data ID "B". This indicates that a circuit is configured by the logic blocks LB1 and LB4 in accordance with design data whose design data ID is "A", and a circuit is configured by logic blocks LB2, LB3, LB5, and LB6 in accordance with design data whose design data ID is "B".

(2) Optimization Unit 109a

The optimization unit 109a generates design data such that two or more circuits to be newly configured by the reconfigurable unit 101a are configured in an optimal disposition.

Specifically, the optimization unit 109a receives a circuit update request including at least one design data ID from an input means such as an input device. Upon receiving the circuit update request, the optimization unit 109a instructs the decryption unit 106a to decrypt the encrypted design data that is identified by the at least one received design data ID. The optimization unit 109a receives at least one piece of design data generated by the decryption unit 106a.

Also, the optimization unit 109a receives design data generated by the generation unit 103a. The optimization unit 109a furthermore reads the state information stored by the internal state storage unit 108a.

Using the read state information and two or more pieces of design data received from the generation unit 103a and the decryption unit 106a, the optimization unit 109a generates design data for two or more circuits to be disposed in a way that maximizes utilization efficiency of logic blocks in the reconfigurable unit 101a.

For example, let us consider a case in which the optimization unit 109a receives design data identified by the design data ID "A" from the generation unit 103a, receives design data identified by the design data ID "B" from the decryption unit 106a, and reads the state information 400 (see FIG. 11) from the internal state storage unit 108a.

Here, the arrangement of logic blocks in the reconfigurable unit 101a is assumed to be known to the optimization unit 109a in advance. The arrangement of the logic blocks refers specifically to the alignment of the logic blocks shown in FIG. 2, that is, the position of the logic blocks in the reconfigurable unit 101a. Furthermore, the optimization unit 109a is also already aware of the number of logic blocks to be used in configuration of the circuit for each piece of design data. This may be described in the design data.

The optimization unit 109a refers to the state information 400 to find out that logic blocks LB3 to LB9 are not being used. Assuming that four logic blocks are necessary to the circuit configuration of the design data identified by the design data ID "B", in order to efficiently utilize the unused logic blocks LB3 through LB9, the optimization unit 109a, for example, uses logic blocks LB1 and LB4 to realize the design data identified by the design data ID "A" that was previously configured using logic blocks LB1 and LB2, and uses logic blocks LB2, LB3, LB5, and LB6 to realize the design data identified by the design data ID "B".

Here, LB7, LB8, and LB9 are the logic blocks not being used, and the reconfigurable unit 101a may use this sequence of three logic blocks to configure another new circuit.

Operations

Figure 13:
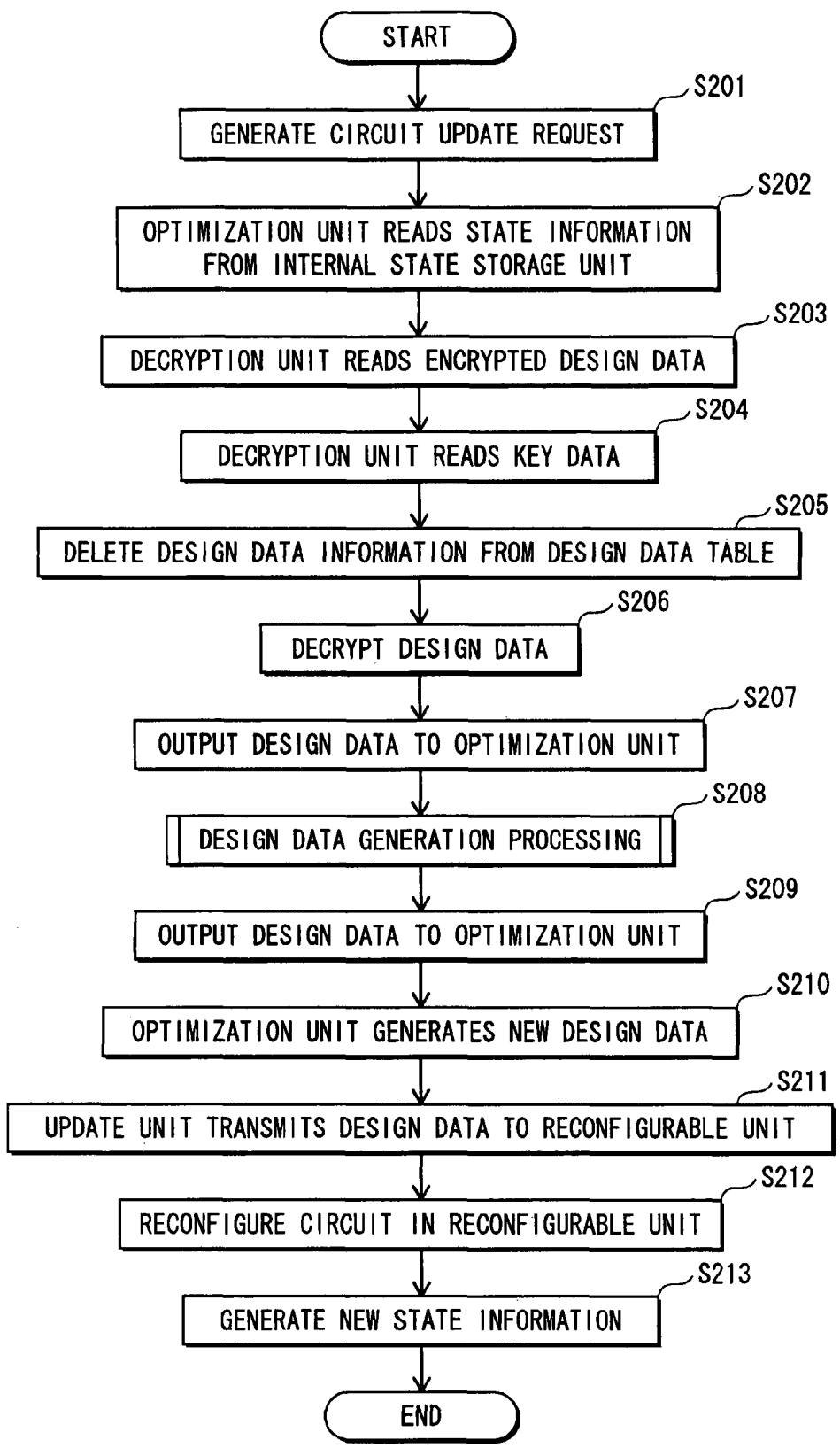

The following describes operations of the information processing apparatus 10a with reference to the flowchart shown in FIG. 13.

First, a circuit update request is generated (step S201), and the generation unit 103a and the optimization unit 109a receive the circuit update request. Specifically, the generation unit 103a and the optimization unit 109a receive the circuit update request via an input means such as an input device. The optimization unit 109a also receives an input of a design data ID along with the circuit update request.

Upon receipt of the circuit update request, the optimization unit 109a reads state information from the internal state storage unit 108a (step S202). The optimization unit 109a outputs the design data ID to the decryption unit 106a, and instructs the decryption unit 106a to decrypt the design data identified by the design data ID.

The decryption unit 106a reads the encrypted design data identified by the design data ID from the design data storage unit 102a (step S203). Next, the decryption unit 106a reads the key data corresponding to the design data ID from the key storage unit 104 (step S204).

The design data storage unit 102a deletes the design data information that includes the encrypted design data read in step S203 from the design data table (step S205).

Next, with use of the key data read in step S204 as a decryption key, the decryption unit 106a decrypts the encrypted design data read in step S203 by performing the decryption algorithm D, thereby generating the design data (step S206). The decryption unit 106a outputs the generated design data to the optimization unit 109a, and the optimization unit 109a receives the design data (step S207).

Then, the generation unit 103a performs processing for generating the design data of a circuit that is currently configured in the reconfigurable unit 101a (step S208). Note that details of the design data generation processing are similar to embodiment 1. The generation unit 103a outputs the generated design data to the optimization unit 109a, and the optimization unit 109a receives the design data (step S209).

Next, the optimization unit 109a generates new design data for effectively utilizing logic blocks in the reconfigurable unit 101a, based upon the state information read in step S202, the design data received in step S207, the design data received in step S209, and the known logic block disposition (step S210).

The update unit 107a receives the new design data from the optimization unit 109a, and transfers the received design data to the reconfigurable unit 101a (step S211).

The reconfigurable unit 101a reconfigures a circuit by setting the value of each SRAM in accordance with the newly received design data (step S212). Next, the internal state storage unit 108a generates state information indicating the state of the reconfigurable unit 101a that has reconfigured the circuit (step S213), and updates the state information.

Embodiment 3

The following describes a circuit update system 1 as embodiment 3 of the present invention.

Structure

Figure 14:
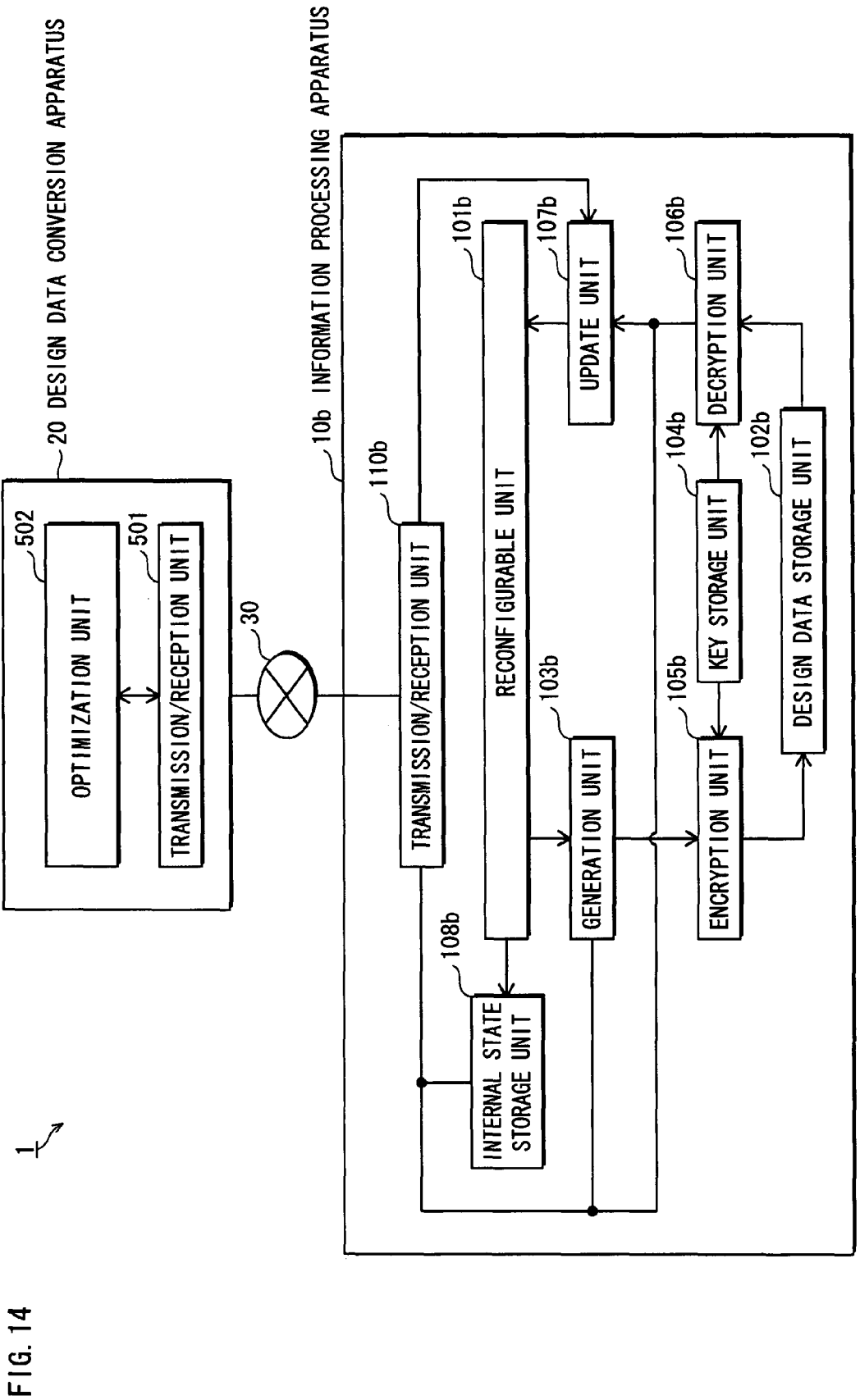
FIG. 14 shows a structure of a circuit updating system 1, which is embodiment 3 of the present invention.

FIG. 14 shows a structure of the circuit update system 1. As shown in FIG. 14, the circuit update system 1 is constituted from an information processing apparatus 10b and a design data conversion apparatus 20 that are connected via a network 30.

As shown in FIG. 14, the information processing apparatus 10b is constituted from a reconfigurable unit 101b, a design data storage unit 102b, a generation unit 103b, a key storage unit 104b, an encryption unit 105b, a decryption unit 106b, an update unit 107b, an internal state storage unit 108a, and a transmission/reception unit 101b. Also, the design data conversion apparatus 20 includes a transmission/reception unit 501 and an optimization unit 502.

In other words, in the circuit update system 1 of embodiment 3, the optimization unit 109a of the information processing apparatus 10a of embodiment 2 exists in the design data conversion apparatus 20, which is an external device connected via the network 30.

The transmission/reception unit 110b and the transmission/reception unit 501 are both network-connected units that exchange information with each other via the network 30.

The optimization unit 502 of the design data conversion apparatus 20 has a similar function to the optimization unit 109a of embodiment 2.

Note that the information processing apparatus 10b and the design data conversion apparatus 20 are each a computer system structured specifically from a microprocessor, a ROM, a RAM, a hard disk unit, etc., and their functions are achieved by the microprocessor executing a computer program stored in the RAM or the hard disk unit.

Operations

The following is a description of the operations of the circuit update system 1 with reference to the drawings.

First, a circuit update request is generated (step S301), and the generation unit 103b and the update unit 107b receive the circuit update request. Specifically, the generation unit 103a and the update unit 107b receive the circuit update request via an input means such as an input device. The update unit 107b also receives an input of a design data ID along with the circuit update request. The update unit 107b that received the circuit update request including the design data ID notifies the design data ID to the decryption unit 106b, and instructs the decryption unit 106b to decrypt the encrypted design data identified by the design data ID.

Upon receipt of the instruction from the update unit 107b, the decryption unit 106b reads the encrypted design data identified by the design data ID from the design data storage unit 102b (step S302). Next, the decryption unit 106b reads the key data corresponding to the design data ID from the key data storage unit 104b (step S303).

The design data storage unit 102b deletes the design data information that includes the encrypted design data read in step S203 from the design data table (step S304).

Next, with use of the encrypted design data read in step S302 as a decryption key, the decryption unit 106b decrypts the encrypted design data read in step S302 by performing the decryption algorithm D, thereby generating the design data (step S305). The decryption unit 106b outputs the generated design data to the update unit 107b. Upon receipt of the design data, the update unit 107b outputs the design data to the transmission/reception unit 110b.

Next, the generation unit 103b performs processing for generating the design data of a circuit that is currently configured in the reconfigurable unit 101b (step S306). The generation unit 103b outputs the generated design data to the transmission/reception unit 110b.

Upon receipt of the design data from the generation unit 103b and the update unit 107b, the transmission/reception unit 110b reads state information from the internal state storage unit 108b (step S307).

The transmission/reception unit 110b transmits the design data received from the generation unit 103b, the design data received from the update unit 107b, and the state information to the design data conversion apparatus 20 via the network 30, and the transmission/reception unit 501 of the design data conversion apparatus 20 receives the design data and the state information (step S308).

The optimization unit 502 of the design data conversion apparatus 20 generates new design data for effectively utilizing logic blocks in the reconfigurable unit 101b of the information processing apparatus 10b, based upon the two or more pieces of design data received in step S308, the state information, and the known logic block disposition (step S309).

The optimization unit 502 transmits the new generated design data to the information processing apparatus 10*b* via the transmission/reception unit 501 and the network 30, and the transmission/reception unit 110*b* of the information processing apparatus 10*b* receives the design data (step S310).

The transmission/reception unit 110*b* outputs the new received design data to the update unit 107*b*. The update unit 107*b* receives the new design data and transfers the new received design data to the reconfigurable unit 101*b*.

The reconfigurable unit 101*b* reconfigures the circuit by setting the value of each SRAM, etc., in accordance with the received design data (step S311).

Then, the internal state storage unit 108*b* generates state information indicating a state of the reconfigurable unit 101*b* that has reconfigured the circuit (step S312), and updates the state information.

Other Variations

Although described with reference to the above embodiments, the present invention is of course not limited to these. Variations such as the following are also included in the present invention.

(1) The reconfigurable unit in the above embodiments is not limited to a device that has a specific structure, such as an FPGA or a PLD. Therefore, although the logic blocks of the above embodiments are realized by LUTs, the logic blocks in the present invention are not limited to being realized by LUTs. The present invention also includes cases in which the logic blocks are realized by ALUs, shift control units, data control units, flip flops, etc., or any combination of these.

(2) The present invention also includes a case in which an external recording medium is used in substitution for the function of the design data storage unit in the above embodiments.

In such a case, the information processing apparatus includes a media input/output unit that receives an input from and outputs information to the external recording medium. When the recording medium is mounted in the media input/output unit, the information processing apparatus writes design data encrypted by the encryption unit to the recording medium via the media input/output unit. Also, the information processing apparatus reads the encrypted design data stored on the recording medium via the media input/output unit, and outputs the read encrypted design data to the decryption unit.

This structure conserves memory capacity of the information processing apparatus and enables memory capacity to be used effectively.

(3) Although the state information held by the internal state storage unit in the above embodiments includes the logic blocks used to configure circuits in correspondence with design data IDs, the state information in the present invention is of course not limited to this. For example, the state information may be any information that can be used by the optimization unit to perform optimization, such as position information of logic blocks that are not being used in circuit configuration.

(4) Although the information processing apparatus of the above embodiments stores key data unique to each design data in the key storage unit, the key information used when encrypting and decrypting the design data in the present invention is not limited to being pre-stored in the key storage unit.

For example, a random number generator may be used to generate a random number sequence every time that encryption or decryption processing is executed on the design data, and the encryption and decryption processing may be executed with use of the random number sequence as key information. Furthermore, the random number sequence generated here may be stored in the key storage unit in correspondence with the design data ID.

Managing key information used in decryption and design data in correspondence with each other in this way enables facilitating the selection of key information to be used in decryption.

Also, there is an effect of facilitating management of keys when an identical key is used for both decryption and encryption.

Also, providing a function to generate keys enables use of a different key for every instance of encryption, thereby realizing a higher level of protection for design data.

Note that in a case in which design data generated by the decryption unit is implemented as a circuit in the reconfigurable unit, and furthermore is generated from the circuit by the generation unit, and thereafter is encrypted again in the encryption unit, the generated design data may be encrypted with use of the same key information (the random number sequence) used during decryption, or a different piece of key information may be generated separately and used for encryption.

(5) Rather than analyzing all of the data from the reconfigurable unit, the information processing apparatus of the present invention may generate design data by selectively analyzing the state information held in the internal state storage unit.

For example, in a case when the internal state storage unit is storing the state information 410 shown in FIG. 12, the generation unit references the state information 410, and only generates design data whose design data ID is "A" from the logic blocks LB1 and LB4. Also, the generation unit may only generate design data whose design data ID is "A" from the logic blocks LB2, LB3, LB5, and LB6.

(6) The information processing apparatus of the present invention may include a circuit deletion unit that deletes a circuit realized in the reconfigurable unit. Specifically, after the generation unit has generated design data of a circuit realized in the reconfigurable unit, the circuit deletion unit may delete the circuit realized in the reconfigurable unit.

The provision of such a circuit deletion unit and deletion of unnecessary circuits by the circuit deletion unit enables the reconfigurable unit to be used more efficiently.

(7) The information processing apparatus of the present invention may be such that, in a case when the generation unit generates design data from a circuit realized in the reconfigurable unit, the generation unit may, for example, authenticate the device or user that requested analysis and generation (the circuit reconfiguration), judge whether or not to generate data in accordance with the result of the authentication, and execute processing based on a result of the judgment.

One example of authentication processing is challenge-response authentication that uses a public key encryption method.

Also, in a case of receiving a request to externally transmit generated design data from the information processing apparatus, the generation unit may authenticate the device or user that sent the request, judge whether or not to externally transmit the generated design data, and execute processing in accordance with a result of the judgment.

Similarly, in processing for writing encrypted design data to an external recording medium, the information processing apparatus may judge whether or not to write the encrypted data, and execute processing in accordance with a result of the judgment.

(8) Although in one of the above embodiments, the information processing apparatus 10*b* transmits design data generated by the generation unit, as is, to the external design data conversion apparatus 20 via the network 30, the present invention is not limited to this. For example, the present invention also includes a case in which all or part of the design data transmitted to the design data conversion apparatus 20 has been encrypted.

In this case, the design data conversion apparatus 20 may execute the conversion processing in the optimization unit 502 in accordance with an internal state and the partially or fully encrypted design data.

One specific example would be a case in which, while keeping the design data confidential, only the position of a circuit in the reconfigurable unit is adjusted.

(9) The design data storage unit included in the information processing apparatus of the present invention may be a memory that is externally accessible, such as a general RAM. Realization by a general RAM or the like enables increasing the capacity of the design data storage unit at a relatively low cost.

Also, the design data storage unit may be a memory existing in the interior of a limited-access integrated circuit.

(10) When configuring two or more circuits in the reconfigurable unit, the optimization unit of one of the above embodiments optimizes the disposition of the circuits. However, instead of the optimization unit, the present invention may include a conversion unit that converts two or more pieces of design data indicating circuits into a new piece of design data.

For example, in a case when a first circuit that achieves a first function is realized in the reconfigurable unit, the generation unit generates first design data from the first circuit. Meanwhile, the decryption unit decrypts second design data that is design data for configuring a second circuit that achieves a second function. Thereafter, the conversion unit may generate third design data for configuring a third circuit that has both the first function and the second function.

Furthermore, rather than simply generating the third design data for configuring the third circuit that has both the first function and the second function, the conversion unit may incorporate the second function into the first function, and generate third design data for configuring a third circuit that achieves a new function that performs advanced processing.

(11) For example, in the reconfigurable unit of the above embodiments, a decryption unit for decrypting encrypted content or the like may be implemented.

Given that a different decryption circuit is implemented in the reconfigurable unit for each algorithm, decryption processing corresponding to various algorithms can be realized by updating the decryption circuit.

However, the present invention is not limited in any way with respect to functions that are achieved by circuits implemented in the reconfigurable device. Any kind of circuit may be configured in the reconfigurable unit.

(12) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals that are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals that have been recorded on the recording media, or by transferring the programs or the digital signals via the network, etc.

(13) Also, in the present invention, all or a portion of the function blocks of information processing apparatuses 10, 10a, and 10b, and the design data conversion apparatus 20 may be realized as an LSI, which is an integrated circuit. Such function blocks may be realized as individual chips, or some or all of the function blocks may be constituted as a single chip. The LSI referred to here is also called an IC, a system LSI, a super LSI, or an ultra LSI, depending on the degree of integration.

Also, the method of integrating circuits is not limited to LSI, but may also be realized by a dedicated circuit. After LSI manufacture, the use of a field programmable gate array (FPGA) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the adaptation of biotechnology is a possibility.

(14) The present invention may be any combination of the above embodiments and variations.

The present invention can be used economically and continuously, for example in an industry of manufacturing and selling devices that can update encryption algorithms.

The invention claimed is:

1. An information processing apparatus, comprising:
   a reconfigurable unit including a plurality of logic blocks that configures a circuit by changing logic of one or more of the logic blocks and changing an inter-logic-block connection;
   a generation unit that generates, by analyzing the reconfigurable unit, first design data indicating a logic of one or more of the logic blocks and an inter-logic-block connection for a first circuit currently configured in the reconfigurable unit; and
   an output unit that outputs, to the reconfigurable unit, second design data indicating a logic of one or more of the logic blocks and an inter-logic-block connection for a second circuit,
   wherein the reconfigurable unit reconfigures the currently configured first circuit in accordance with the second design data to configure the second circuit, and
   the information processing apparatus further comprises:
   a design data storage unit that stores therein the second design data;
   a deletion unit that deletes the second design data from the design data storage unit after the output unit has output the second design data to the reconfigurable unit; and
   a write unit that writes the first design data generated by the generation unit to the design data storage unit;
   an encryption unit that encrypts the first design data generated by the generation unit, wherein
   the write unit writes the first design data that is encrypted to the design data storage unit.

2. The information processing apparatus of claim 1, wherein
the second design data stored in the design data storage unit is encrypted,
the information processing apparatus further comprises:
a decryption unit that decrypts the encrypted second design data to generate the second design data, and
the output unit outputs the second design data that is generated by the decryption unit to the reconfigurable unit.

3. The information processing apparatus of claim 2, further comprising:
a key information storage unit that securely stores therein first key information in correspondence with the first design data, and second key information in correspondence with the second design data, wherein
the encryption unit reads the first key information from the key information storage unit, and encrypts the first design data with use of the read first key information, and
the decryption unit reads the second key information from the key information storage unit, and decrypts the second design data with use of the read second key information.

4. The information processing apparatus of claim 3, further comprising:
a key information generation unit that generates the first and second key information in correspondence with the first and second design data respectively, and writes the first and second key information generated by the key information generation unit to the key information storage unit.

5. The information processing apparatus of claim 1, further comprising:
an internal state storage unit that stores therein an internal state indicating a position of the one or more logic blocks used in the configuration of the first circuit in the reconfigurable unit; and
an optimization unit that generates the second design data so as to enable optimized use of the reconfigurable unit, the second design data being generated with use of the internal state stored in the internal state storage unit, the first design data generated by the generation unit, and third design data for a circuit that achieves a second function that differs from a first function achieved by the first circuit, wherein
the output unit outputs the second design data that is generated by the optimization unit to the reconfigurable unit.

6. The information processing apparatus of claim 5, wherein
the internal state storage unit generates new internal state information indicating the position of the one or more logic blocks used in the configuration of the first circuit achieving the first function and a position of one or more of the logic blocks used in the configuration of the circuit achieving the second function, and stores the generated new internal state information.

7. The information processing apparatus of claim 1, further comprising:
an internal state storage unit that stores therein an internal state indicating a position of the one or more logic blocks used in the configuration of the first circuit in the reconfigurable unit, wherein
the generation unit generates the first design data by selectively analyzing the reconfigurable unit in accordance with the internal state stored by the internal state storage unit.

8. The information processing apparatus of claim 7, being connected to an external device via a network, and further comprising:
a transmission unit that transmits, to the external device, the internal state stored in the internal state storage unit, the first design data generated by the generation unit, and third design data for a circuit achieving a function that is different from the first function; and
a reception unit that receives the second design data that enables optimized use of the reconfigurable unit from the external device.

9. The information processing apparatus of claim 1, wherein the first circuit configured in the reconfigurable unit in accordance with the first design data achieves a first function, and
the information processing apparatus further comprises:
a design data conversion unit that generates, with use of the first design data generated by the generation unit and third design data for configuring a third circuit that achieves a second function that is different from the first function, the second design data for configuring the second circuit that achieves the first and second functions.

10. The information processing apparatus of claim 1, further comprising:
a media input/output unit that receives an input from and output information to an externally connected recording medium; and
a write unit that writes the first design data to the recording medium via the media input/output unit, wherein
the output unit acquires, via the media input/output unit, the second design data from the recording medium on which the second design data is recorded, and outputs the acquired second design data to the reconfigurable unit.

11. The information processing apparatus of claim 10, further comprising:
an encryption unit that encrypts the first design data generated by the generation unit, wherein
the write unit writes the first design data that is encrypted to the recording medium.

12. The information processing apparatus of claim 11, wherein
the second design data stored in the recording medium is encrypted, and
the information processing apparatus further comprises:
a decryption unit that decrypts the encrypted second design data to generate the second design data, and outputs the second design data to the reconfigurable unit.

13. A processing method using an information processing apparatus that comprises a plurality of logic blocks, a reconfigurable unit that configures a circuit by changing logic of the logic blocks and an inter-logic-block connection, an extraction unit and an output unit, the processing method comprising:
extracting, using the extraction unit, from the reconfigurable unit, a first design data indicating a logic of one or more logic blocks and an inter-logic block connection for a first circuit currently configured in the reconfigurable unit;
outputting, using the output unit, to the reconfigurable unit, a second design data indicating a logic of one or more logic blocks and an inter-logic block connection for a second circuit; and
reconfiguring, using the reconfigurable unit, the second circuit in accordance with the second design data, wherein the processing method further comprises:
storing, using a design data storage unit, the second design data;
deleting, using a deletion unit, the second design data from the design data storage unit after the output unit has output the second design data to the reconfigurable unit; and
writing, using a write unit, the first design data generated by the generation unit to the design data storage unit;
encrypting, using an encryption unit, the first design data generated by the generation unit, wherein the writes step further writes the first design data that is encrypted to the design data storage unit.

14. A non-transitory computer-readable storage medium storing a computer program using an information processing apparatus comprising a reconfigurable unit including a plurality of logic blocks that reconfigures a circuit by changing logic of logic blocks and an inter-logic-block connection, an extraction unit and an output unit, the computer program causing a computer to perform steps comprising:
   extracting, using the extraction unit, from the reconfigurable unit, a first design data indicating a logic of one or more logic blocks and an inter-logic block connection for a first circuit currently configured in the reconfigurable unit;
   outputting, using the output unit, to the reconfigurable unit, a second design data indicating a logic of one or more logic blocks and an inter-logic-block connection for a second circuit; and
   reconfiguring, using the reconfigurable unit, the second circuit in accordance with the second design data,
   wherein the computer program causing the computer to further perform steps, comprising:
   storing, using a design data storage unit, the second design data;
   deleting, using a deletion unit, the second design data from the design data storage unit after the output unit has output the second design data to the reconfigurable unit; and
   writing, using a write unit, the first design data generated by the generation unit to the design data storage unit;
   encrypting, using an encryption unit, the first design data generated by the generation unit, wherein
   the writes step further writes the first design data that is encrypted to the design data storage unit.

15. An integrated circuit comprising:
   a reconfigurable unit including a plurality of logic blocks that configures a circuit by changing logic of one or more of the logic blocks and changing an inter-logic-block connection;
   a generation unit that generates, by analyzing the reconfigurable unit, first design data indicating a logic of one or more of the logic blocks and an inter-logic-block connection for a first circuit currently configured in the reconfigurable unit; and
   an output unit that outputs, to the reconfigurable unit, second design data indicating a logic of one or more of the logic blocks and an inter-logic-block connection for a second circuit, wherein
   the reconfigurable unit reconfigures the currently configured first circuit in accordance with the second design data to configure the second circuit, and
   wherein the integrated circuit further comprises:
   a design data storage unit that stores therein the second design data;
   a deletion unit that deletes the second design data from the design data storage unit after the output unit has output the second design data to the reconfigurable unit; and a write unit that writes the first design data generated by the generation unit to the design data storage unit;
   an encryption unit that encrypts the first design data generated by the generation unit, wherein
   the write unit writes the first design data that is encrypted to the design data storage unit.

16. The information processing apparatus of claim 1, wherein the generation unit analyzes each of the logic blocks included in the reconfigurable unit.

* * * * *